Figure 1:
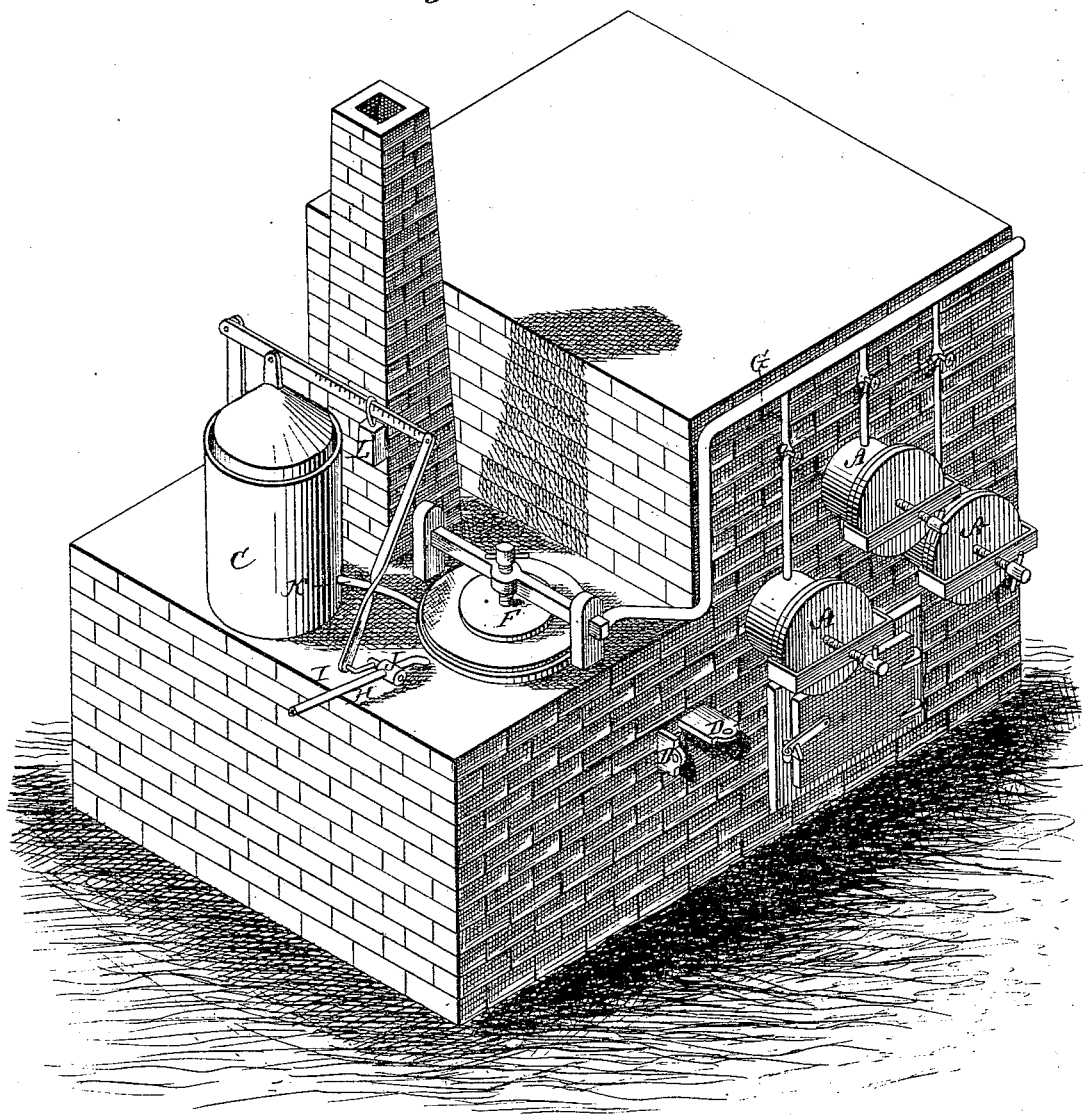

A. C. RAND.
Process and Apparatus for Manufacturing Gas.
No. 166,409.                              Patented Aug. 3, 1875.
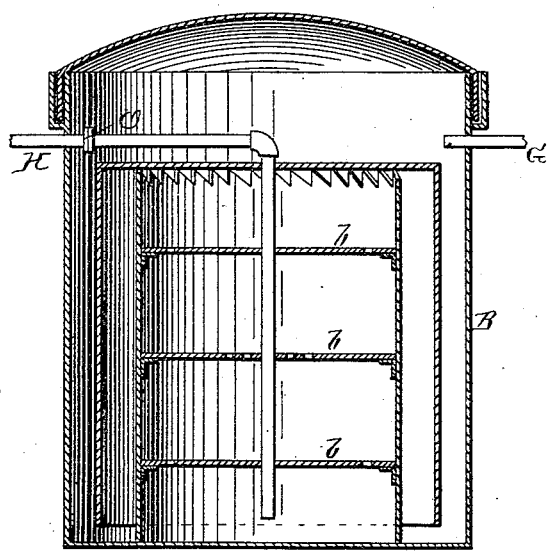
Fig. 3.
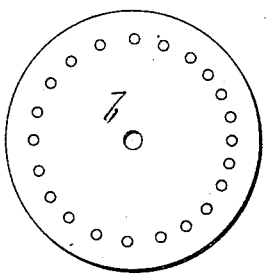
Fig. 4.
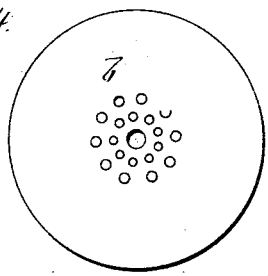
WITNESSES                                 INVENTOR

UNITED STATES PATENT OFFICE.

ALONZO C. RAND, OF MINNEAPOLIS, MINNESOTA.

IMPROVEMENT IN PROCESSES AND APPARATUS FOR MANUFACTURING GAS.

Specification forming part of Letters Patent No. 166,409, dated August 3, 1875; application filed June 8, 1875.

*To all whom it may concern:*

Be it known that I, ALONZO C. RAND, of Minneapolis, in the county of Hennepin, and in the State of Minnesota, have invented certain new and useful Improvements in Process and Apparatus for the Manufacture of Gas; and do hereby declare that the following is a full, clear, and exact description thereof, reference being had to the accompanying drawings and to the letters of reference marked thereon, making a part of this specification:

This invention relates to the manufacture of illuminating-gas from hydrocarbon liquids, and insures the most perfect results.

In order that its advantages may be fully understood, it is necessary to explain the progress made in this direction; why so many failures and partial successes, and why this invention will make the utilization of petroleum and its distillates for illuminating-gas manufacture a perfect success.

Martineau & Taylor, Hilliyer, Hill, Hansor, and Smith, of England; Chassemot, and others, of France, and numerous inventors in America, have obtained patents for manufacturing illuminating-gas from various oils, resins, fatty substances, petroleum, naphtha, &c. They all embrace the vaporization of these substances in a vaporizer supplied with a moderate heat, and then converting them by an increased heat in the converters or retorts into a fixed or permanent gas, the claims for the separate inventions being for mechanical devices for accomplishing this purpose.

All the earlier patents permitted the liquid to drop or feed slowly into the vaporizers, while some of the later American patents provide for keeping the vaporizer constantly filled while the process is going on; while others provide a vaporizer of sufficient capacity to hold sufficient for a batch, which they distil off carefully with moderate heat.

It is safe to assume, from the results obtained, that they all failed to recognize the fact that the temperature necessary to convert the vapor into a fixed gas, without waste of material, depends upon two conditions, viz., the specific gravity of the vapor, and the temperature of the converters or retorts. I have found, by repeated experiments, that the heat required to convert into fixed or permanent gas the heavier vapors of petroleum will produce destructive distillation; or, in other words, will convert into lamp-black or dry carbon the more volatile or lighter vapors of petroleum; also, that if the temperature of the retorts is right for changing the lighter vapors into permanent gas, the heavier vapors will pass through the retorts and condense in the hydraulic mains, condensers, and conduits.

The reason, therefore, that the older methods have failed to successfully utilize hydrocarbon liquids for gas-lighting lies in the fact that the vapor furnished the retorts was not homogeneous, and it is absolutely necessary it should be in order to use up all the gas-making material. For example, I will first confine myself to those methods that furnish the oil to the vaporizer in drops or small streams. Now, if the vaporizer is hot enough to vaporize the heavier portions of the material, the lighter or more volatile part will assume the vapor condition instantly, and will carry over mechanically the heavier parts of the liquid in globules into the retorts. Now, assuming that the temperature of the retorts is right to convert the lighter vapors into gas, the heavier will pass up the stand-pipes into the various conduits and clog them up with asphalt, &c. Now, on the other hand, if the retorts are hot enough to convert the heavier vapors into gas, the lighter will be made into lamp-black or dry carbon; and if an exhauster is used, the particles will be drawn out of the retorts into the pipes and become as great a nuisance as in the former case. Thus the iniquity of the usual processes commences by a wasteful use of the material, and ends by clogging up the works with dry carbon, &c.

In the more modern plans, where the vaporizer is filled with liquid, the lighter vapors may be carefully distilled off and the retorts may be with great care kept at low heats, which may be gradually increased as the gravity of the vapor becomes heavier; but this requires very careful manipulation, as from the moment the vapor commences to pass off until all is vaporized, the gravity is constantly increasing, so that the heats in the retorts have to be constantly increased until the batch is worked off. This co-relation existing between the specific gravity of the vapor and the temperature requisite for its perfect conversion into a permanent gas has heretofore been ignored. This discovery is mine, and has led me to invent a vaporizer that will furnish the retorts with vapor that at all times will be homogeneous, so that the converting temperature of the retorts will be unchanged, thus insuring the most thorough utilization of the material. My vaporizer, with its regulator, will always provide the retorts with vapor of a uniform gravity, and under any pressure desired. That is, the pressure will remain the same at all times, unless the regulator is purposely changed.

In order to enable others skilled in the art to which my invention appertains to make and use the same, I will now proceed to describe its construction and operation, referring to the annexed drawings, in which—

Figure 2:
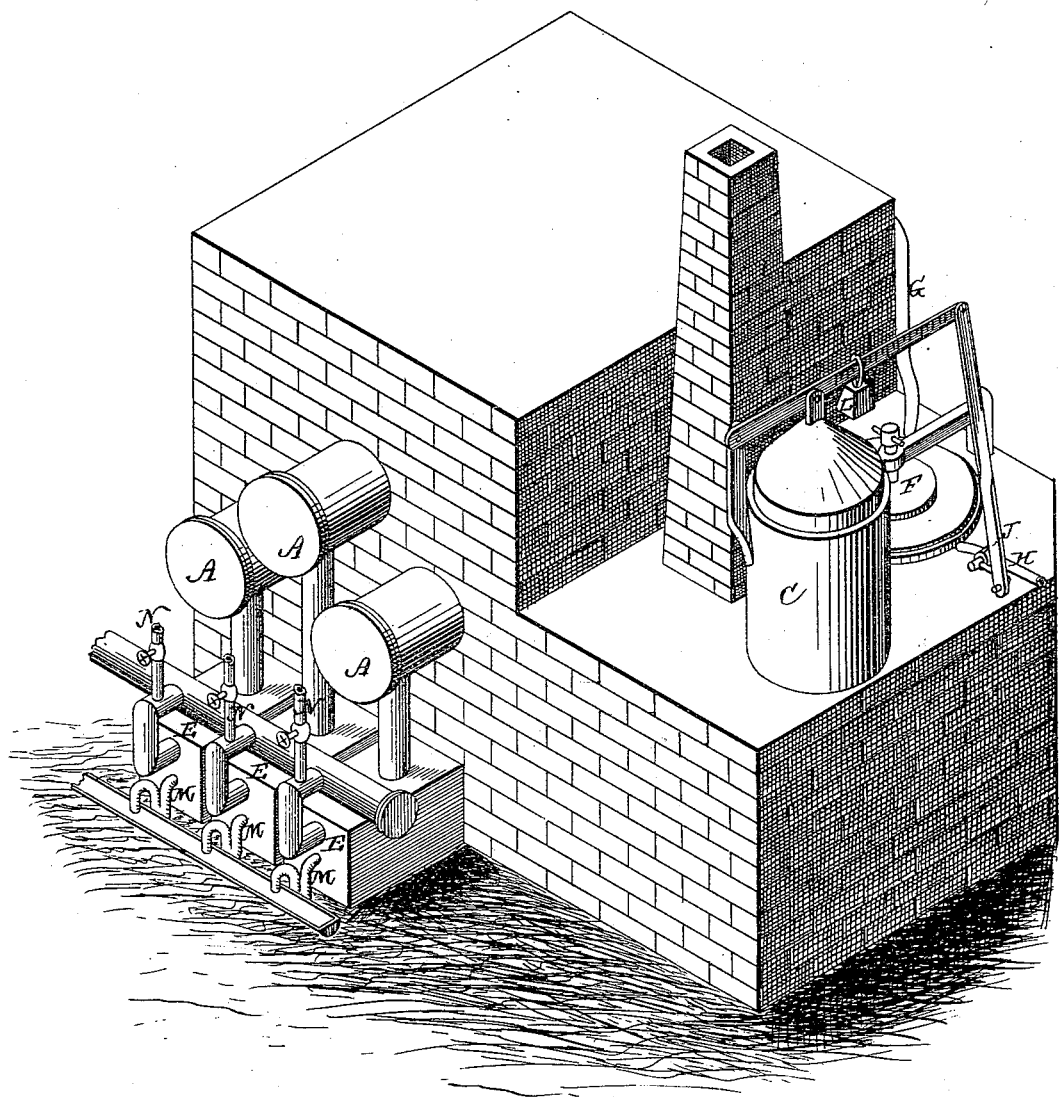

Figures 1 and 2 are perspective views of a machine for manufacturing illuminating-gas embodying my invention. Fig. 3 is a vertical section of the vaporizer, and Fig. 4 shows detached parts of the same.

A represents a bench of retorts. B is the vaporizer. C is an automatic arrangement to feed the liquid into the vaporizer. $b\ b$ are diaphragms in the vaporizer to mix vapors. D D are dampers to shut off heat from the vaporizer. E E are sealed mains or chambers. F is the top or cover to the still. G is the vapor-pipe leading to the retorts. $g\ g$ are valves regulating the flow of vapor to the retorts. H is a feed-pipe to the vaporizer. I is a valve in this pipe; J, valve to be worked automatically; K, vapor-pipe leading to automatic regulator; L, weight to control the pressure in the vaporizer. M M are overflows to seals. N N are water-pipes to feed sprays for moistening gas; O, connection in water-pipe.

The operation of this device is as follows: Fire having been made under the retorts, and the direct draft having been opened, when the heat of the retort is sufficient to convert the vapor, the damper in the direct draft is closed, and the one under the vaporizer opened. The vaporizer in a few moments becomes hot enough to vaporize the liquid, which is at first let in by hand. The vapor will pass up from the bottom of the vaporizer, the feed-pipe having been arranged to deliver it on the bottom. The vapor cannot pass at once into the retorts, as in the older plans, but is compelled to pass upward and in contact with the lowest diaphragm, through which it passes near the edge through perforations into the space between the top of the lowest diaphragm and the middle one. It cannot from thence pass into the next chamber, made by the upper diaphragm, without first traveling underneath to the center of the middle diaphragm, through which it passes into the upper one and out at the edge of same into the chamber above, all the particles thoroughly vaporized and made homogeneous by mixing and diffusion. The vapor is kept under constant pressure by the regulator. When a change is required it may be accomplished by moving the weight on the lever-bar actuating the supply-valve.

Other means may be employed to mix the vapors in the vaporizer other than those described. A series of meshes of wire would answer the purpose. I only describe one plan for accomplishing this very important purpose.

The automatic regulator is made after the usual plans of gravitating gas-holders, the vapor from the vaporizer raising the holder, and closing off, or partially closing off, the supply of oil.

The lever-bar is marked or graduated from one inch pressure, say, to ten inches; and whatever pressure the lever-weight indicates on the lever, a corresponding pressure in the vaporizer will be maintained.

The great advantage this appliance has over hand-feed lies in the fact that an equable pressure is of vital importance in preserving an equable heat in the retorts.

Perfect results are only obtained when these conditions are preserved, viz., uniform pressure of homogeneous vapor, delivered in uniform quantities into the converters, kept at a uniformly proper temperature. When these conditions are observed, neither dry carbon nor condensation will occur.

The proper temperature for converting homogeneous vapor is a bright cherry-red. I will here state that this heat would be too high for the more volatile vapors, and too low for the heavier vapor. In the former they would become dry carbon, and the latter would be condensed; but as the vapors are intimately mixed the temperature will be found right for utilizing the whole, and thus escape both iniquities.

The vapor enters the retorts through the pipes and in the front ends, and passes through and out at the rear into seals, each outlet-pipe being provided with a seal and chamber, as shown. A jet of water is furnished each chamber, and distributed through a rose in fine jets.

The liquid from the overflows will always indicate whether the heats are right, and for this reason I provide a separate overflow, seal, and chamber for each retort. If the water issuing from the overflow be examined and fine particles of carbon are seen, it will indicate that the heats are too high; and if condensation shows, the heats are too low. Thus the overflow-pipes will always enable the operator to determine the temperature of the retorts. If, for example, the water should indicate too high heat in any one of the retorts, the operator would simply open the valve in the vapor-pipe, and increase the flow of vapor. This, passing through the retort, would carry off the excess of heat rapidly; and, on the other hand, if the water indicated much oily condensation, the vapor-feed valve should be closed partially until the retort had required its heat.

I provide, however, in order that these contingencies may be remote, a register or index on the handle of each valve, that all may be closed or opened alike. I use on the stand-pipes or outlets a pet-cock, to show the condition of the gas before it reaches the main or seal. The gas passes from the sealed chamber or main into condensers, and thence into the gas-holders, no purification being necessary.

I exhibit a setting of three iron cylindrical retorts in the drawings. Of course, where clays are used the vapor must be carried through a pipe in the interior of the retort, and then be permitted to pass back to the front and up the stand-pipe.

Having thus fully described my invention, what I claim as new, and desire to secure by Letters Patent, is—

1. The process for manufacturing gas for illuminating purposes by thoroughly combining and mixing the vapors of hydrocarbon of different specific gravities as they are generated in a vaporizer, for the purpose of forming a homogeneous vapor, and submitting the same, under uniform automatic pressure and in uniform quantities, to destructive distillation in heated retorts, substantially as herein set forth.

2. In the manufacture of illuminating-gas, the method of vaporization, which consists in automatically and proportionately regulating the feed and outflow of a vaporizer, and at the same time maintaining an equable pressure therein, as set forth.

3. The vaporizer B, provided with a series of perforated diaphragms, for mixing the vapor generated therein and rendering it homogeneous, and automatic devices for regulating the admission of hydrocarbon and controlling the pressure of vapor therein, in combination with the retorts A, for converting the vapor into fixed gas, substantially as set forth.

In testimony that I claim the foregoing I have hereunto set my hand this 10th day of May, 1875.

ALONZO C. RAND.

Witnesses:
A. G. CHAPIN,
WM. W. FOLWELL.